United States Patent
Song

(10) Patent No.: US 7,368,937 B2
(45) Date of Patent: May 6, 2008

(54) INPUT TERMINATION CIRCUITS AND METHODS FOR TERMINATING INPUTS

(75) Inventor: Ho-Young Song, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/426,139

(22) Filed: Jun. 23, 2006

(65) Prior Publication Data

US 2006/0232294 A1 Oct. 19, 2006

Related U.S. Application Data

(62) Division of application No. 10/849,322, filed on May 19, 2004, now Pat. No. 7,091,744.

(30) Foreign Application Priority Data

Sep. 2, 2003 (KR) .................. 10-2003-0061250

(51) Int. Cl.
*H03K 17/16* (2006.01)
*H03K 19/003* (2006.01)

(52) U.S. Cl. .................. 326/30; 326/32; 326/33; 326/34

(58) Field of Classification Search ............ 326/26–27, 326/30–34; 327/108–112
See application file for complete search history.

(56) References Cited

U.S. PATENT DOCUMENTS

| 5,821,808 | A | * | 10/1998 | Fujima | 327/541 |
| 5,831,467 | A | | 11/1998 | Leung et al. | |
| 5,889,707 | A | | 3/1999 | Yang | |
| 6,411,122 | B1 | | 6/2002 | Mughal et al. | |
| 6,686,763 | B1 | * | 2/2004 | Yen | 326/30 |
| 6,922,076 | B2 | | 7/2005 | Braceras et al. | |
| 7,075,339 | B2 | * | 7/2006 | Kajimoto | 327/87 |

* cited by examiner

*Primary Examiner*—Anh Q. Tran
(74) *Attorney, Agent, or Firm*—Myers Bigel Sibley & Sajovec

(57) ABSTRACT

An input signal provided to an input terminal is terminated by coupling the input terminal to a ground voltage through a pull down transistor if the input signal at the input terminal is at a "high" level and coupling the input terminal to a power voltage through a pull up transistor if the input signal at the input terminal is at a "low" level. Termination circuits are provided including on die termination circuits.

16 Claims, 7 Drawing Sheets

US 7,368,937 B2

1

INPUT TERMINATION CIRCUITS AND METHODS FOR TERMINATING INPUTS

CLAIM OF PRIORITY

This application claims priority under 35 U.S.C. § 120 as a divisional of U.S. patent application Ser. No. 10/849,322, filed May 19, 2004 now U.S. Pat. No. 7,091,744, which claims priority under 35 U.S.C. § 119 from Korean Patent Application No. 2003-61250, filed Sep. 2, 2003, the disclosures of which are hereby incorporated herein by reference in there entireties.

FIELD OF THE INVENTION

The present invention relates to semiconductor devices and, more particularly, to termination circuits of semiconductor devices.

BACKGROUND OF THE INVENTION

Signal termination techniques are, conventionally, used to reduce or prevent a transmitted signal from being reflected from a receiving side toward the transmitting side. Generally, a signal termination technique is provided on a board with a semiconductor device, such as a semiconductor memory device, rather than being provided by the semiconductor device itself. Signal lines are arranged to transmit a signal between devices on the board, and a termination voltage and a termination resistor are arranged at end portions of the signal lines to thereby terminate the signal.

However, as the number of signal lines has increased, it has become difficult to arrange the termination voltage and the termination resistor. As a result, techniques have been introduced that terminate a signal within the device mounted on the board rather than on the board. These techniques may be collectively referred to as on die termination (ODT).

FIG. 1 is a block diagram schematically illustrating a conventional on die termination technique. A memory controller 10 and a memory 20 are provided. The memory 20 includes a command buffer (CB) 22, a command decoder (CD) 24, data input buffers (DIB) 26-1 to 26-n, and on die termination circuits (ODT) 28-1 to 28-n. In FIG. 1, the reference numeral 21 denotes a command input pad(s) for inputting a command, and reference numerals 23-1 to 23-n denote data input pads for inputting data.

The memory controller 10 transmits a command (COM) and data (DA) through command lines com and data lines da. The memory 20 performs a write operation or a read operation in response to the command (COM) input through the command pad(s) 21. The command buffer 22 buffers a command (COM). The command decoder 24 decodes the buffered command output from the command buffer 22 to generate a write command or a read command and an on die termination control signal. Each of the data input buffers 26-1 to 26-n buffer data DA inputted through the data input pads 23-1 to 23-n in response to the on die termination control signal output from the command decoder 24. Each of the on die termination circuits 28-1 to 28-n is enabled in response to the on die termination control signal output from the command decoder 24 to terminate signals inputted through the data input pads 23-1 to 23-n.

The on die termination technique of FIG. 1 is described with reference to a memory system, however, an on die termination circuit can be arranged on a data input pad (or terminal) of any device having a data input function.

2

FIG. 2 is a circuit diagram illustrating a conventional on die termination circuit. The on die termination circuit of FIG. 2 includes inverters I1 to I3, a PMOS transistor P1, and an NMOS transistor N1. In FIG. 2, TE denotes an on die termination control signal and reference numeral 23 denotes a data input pad.

In the circuit of FIG. 2, when an on die termination control signal TE of a "low" level is applied, the inverter I2 generates a signal of a "low" level and the inverter I3 generates a signal of a "high" level. Thus, the PMOS transistor P1 and the NMOS transistor N1 are turned off so that the pad 23 goes to a high impedance state. When the die termination control signal TE is at a "high" level, the inverter I2 generates a signal of a "high" level and the inverter I3 generates a signal of a "low" level. Thus, the PMOS transistor P1 and the MOS transistor N1 are turned on, so that the pad 23 has a power voltage VCC/2. Therefore, a signal applied through the pad 23 is terminated to a level of VCC/2.

However, when the on die termination control signal TE is at a "high" level and a signal of a "high" level is applied through the pad 23, the signal of a "high" level applied through the pad 23 is not raised completely to the "high" level. This is because the PMOS transistor P1 and the NMOS transistor N1 are turned on so that a current continually flows through the NMOS transistor N1.

Also, when the on die termination control signal TE is at a "high" level and a signal of a "low" level is applied through the pad 23, the signal of a "low" level applied through the pad 23 does not drop completely to the "low" level. This is because the PMOS transistor P1 and the NMOS transistor N1 are turned on so that a current is continually supplied through the PMOS transistor P1.

The conventional on die termination circuit of FIG. 2 may be advantageous for high speed operation in that a signal applied through the pad 23 does not experience a "full swing" between a power voltage (VCC) and a ground voltage when on die termination is provided but has a disadvantage in that the PMOS transistor and the NMOS transistor are always turned on during on die termination operation so current consumption occurs from the power voltage to the ground voltage, thereby increasing power consumption.

FIG. 3 is a circuit diagram illustrating another conventional on die termination circuit. The on die termination circuit of FIG. 3 includes an inverter I4, a NOR gate NOR1, a NAND gate NA1, a PMOS transistor P2, and an NMOS transistor N2. When an on die termination control signal TE of a "low" level is generated, the NAND gate NA1 generates a signal of a "high" level output. The inverter I4 generates a signal of a "high" level so the NOR gate NOR1 generates a signal of a "low" level. Thus, the PMOS transistor P2 and the NMOS transistor N2 are turned off and on die termination operation is not performed.

When the on die termination control signal TE at a "high" level and a signal of a "high" level is applied through the pad 23, the NAND gate NA1 generates a signal of a "low" level and the PMOS transistor P2 is turned on. The inverter I4 generates a signal of a "low" level and the NOR gate NOR1 generates a signal of a "low" level and the NMOS transistor N2 is turned off. Therefore, the signal of a "high" level applied through the pad 23 is terminated to a power voltage (VCC) level.

When the on die termination control signal TE is at a "high" level and a signal of a "low" level is applied through the pad 23, the NAND gate NA1 generates a signal of a "high" level and the PMOS transistor P2 is turned off. The inverter I4 generates a signal of a "low" level and the NOR gate NOR1 generates a signal of a "high" level and the NMOS transistor N2 is turned on. Therefore, a signal of a "low" level applied through the pad 23 is terminated to a ground voltage level.

The conventional on die termination circuit of FIG. 3, may be advantageous in that either the PMOS transistor or the NMOS transistor is turned on during on die termination and, therefore, current flow does not occur from a power voltage to a ground voltage, thus, potentially decreasing power consumption. However, it may not be appropriate for high speed operation in that a signal applied through the pad experiences a full swing between VCC and ground.

SUMMARY OF THE INVENTION

Some embodiments of the present invention provide for terminating an input signal provided to an input terminal by coupling the input terminal to a ground voltage through a pull down transistor if the input signal at the input terminal is at a "high" level and coupling the input terminal to a power voltage through a pull up transistor if the input signal at the input terminal is at a "low" level.

In further embodiments of the present invention, the pull up transistor and the pull down transistor are responsive to a termination control signal. The input terminal is coupled to a ground voltage through a pull down transistor if the input signal at the input terminal is at a "high" level and the termination control signal is activated and the input terminal is coupled to a power voltage through a pull up transistor if the input signal at the input terminal is at a "low" level and the termination control signal is activated.

In additional embodiments of the present invention, on one of pull up transistor and the pull down transistor is turned on to couple the input terminal to the corresponding one of the power voltage or the ground voltage and the other one of the pull up transistor and the pull down transistor is turned off when an input signal is not applied to the input terminal.

The input terminal and the pull up and pull down transistors may be on a die of a semiconductor device such that on die termination is provided.

In further embodiments of the present invention, an input termination circuit includes pull up means for terminating an input signal to a power voltage level responsive to the input signal being at a "low" level and pull down means for terminating the input signal to a ground voltage level in responsive to the input signal being at a "high" level. The pull up means and the pull down means may each also be responsive to a termination control signal.

In additional embodiments of the present invention, the pull up means includes a NOR gate that logically NORs an inverted signal of the termination control signal and the input signal and a pull up transistor having controlled terminals coupled to a power voltage and a terminal to which the input signal is applied and a controlling terminal coupled to an output of the NOR gate. The pull up transistor may be an NMOS transistor.

In further embodiments of the present invention, the pull down means includes a NAND gate that logically NANDs the termination control signal and the input signal and a pull down transistor having controlled terminals coupled to a ground voltage and a terminal to which the input signal is applied and a controlling terminal coupled to an output of the NAND gate. The pull down transistor may be a PMOS transistor.

In additional embodiments of the present invention, a transmission gate responsive to the termination control signal is coupled between the controlling terminals of the pull up transistor and the pull down transistor. The transmission gate may be a CMOS transmission gate.

In still further embodiments of the present invention, the pull up means includes a first comparator circuit configured to be enabled responsive to the termination control signal and configured to compare a reference voltage and the input signal. A pull up transistor has controlled terminals coupled to a power voltage and a terminal to which the input signal is applied and a controlling terminal coupled to an output of the first comparator circuit. A first reset transistor is coupled to the controlling terminal of the pull up transistor and responsive to the termination control signal to turn off the pull up transistor when the termination control signal is inactivated. The pull up transistor may be an NMOS transistor. The first reset transistor may includes an NMOS transistor having a first controlled terminal coupled to the controlling terminal of the pull up transistor, a second controlled terminal coupled to a ground voltage and a controlling terminal coupled to an inverted signal of the termination control signal.

In further embodiments of the present invention, the pull down means includes a second comparator circuit configured to be enabled responsive to the termination control signal and configured to compare a reference voltage and the input signal. A pull down transistor has controlled terminals coupled to a ground voltage and a terminal to which the input signal is applied and a controlling terminal coupled to an output of the second comparator circuit. A second reset transistor is coupled to the controlling terminal of the pull down transistor and responsive to the termination control signal to turn off the pull down transistor when the termination control signal is inactivated. The pull down transistor may be a PMOS transistor. The second reset transistor may include a PMOS transistor having a first controlled terminal coupled to the controlling terminal of the pull down transistor, a second controlled terminal coupled to a power voltage and a controlling terminal coupled to the termination control signal.

In still further embodiments of the present invention, a transmission gate responsive to the termination control signal and coupled between the controlling terminals of the pull up transistor and the pull down transistor. The transmission gate may be a CMOS transmission gate.

Furthermore, the input termination circuit may be an on die termination circuit.

Further embodiments of the present invention provide an input termination circuit that includes a pull up transistor configured to pull up an input terminal to a power voltage level, a pull down transistor configured to pull down the input terminal to a ground voltage and a control circuit responsive to a signal applied to the input terminal to turn on the pull down transistor and turn off the pull up transistor in response to the input signal being at a "high" level and to turn off the pull down transistor and turn on the pull up transistor in response to the input signal being at a "low" level. The control circuit may also be responsive to a termination control signal.

In additional embodiments of the present invention, the control circuit includes a NOR gate that logically NORs an inverted signal of the termination control signal and the input signal and has an output coupled to a controlling terminal of the pull up transistor and a NAND gate that logically NANDs the termination control signal and the input signal and has an output coupled to a controlling terminal of the pull down transistor. A transmission gate responsive to the termination control signal and coupled between the controlling terminals of the pull up transistor and the pull down transistor may also be provided. The transmission gate may be a CMOS transmission gate.

In further embodiments of the present invention, the control circuit includes a first comparator circuit configured to be enabled responsive to the termination control signal and configured to compare a reference voltage and the input signal and having an output coupled to a controlling terminal of the pull up transistor and a first reset transistor coupled to the controlling terminal of the pull up transistor and responsive to the termination control signal to turn off the pull up transistor when the termination control signal is inactivated. A second comparator circuit is configured to be enabled responsive to the termination control signal and is configured to compare a reference voltage and the input signal and having an output coupled to a controlling terminal of the pull down transistor. A second reset transistor is coupled to the controlling terminal of the pull down transistor and responsive to the termination control signal to turn off the pull down transistor when the termination control signal is inactivated. The first reset transistor may include an NMOS transistor having a first controlled terminal coupled to the controlling terminal of the pull up transistor, a second controlled terminal coupled to a ground voltage and a controlling terminal coupled to an inverted signal of the termination control signal. The second reset transistor may include a PMOS transistor a first controlled terminal coupled to the controlling terminal of the pull down transistor, a second controlled terminal coupled to a power voltage and a controlling terminal coupled to the termination control signal. The pull down transistor may be a PMOS transistor and the pull up transistor may be an NMOS transistor. A transmission gate responsive to the termination control signal and coupled between the controlling terminals of the pull up transistor and the pull down transistor may also be provided. The transmission gate may be a CMOS transmission gate.

The input termination circuit may be provided as an on die termination circuit.

DETAILED DESCRIPTION OF THE INVENTION

The present invention will now be described more fully with reference to the accompanying drawings, in which embodiments of the invention are shown. This invention may, however, be embodied in different forms and should not be construed as being limited to the embodiments set forth herein. Rather, these embodiments are provided so that this disclosure will be thorough and complete, and will fully convey the scope of the invention to those skilled in the art. It will be understood that when an element is referred to as being "on", "connected to" or "coupled to" another element, it can be directly on, connected or coupled to the other element or intervening elements may be present. In contrast, when an element is referred to as being "directly on," "directly connected to" or "directly coupled to" another element, there are no intervening elements present. Like numbers refer to like elements. As used herein the term "and/or" includes any and all combinations of one or more of the associated listed items.

It will be understood that although the terms first and second may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, for example, a first element, component, region, layer, or section discussed below could be termed a second element, component, region, layer, or section without departing from the teachings of the present invention.

Figure 1:
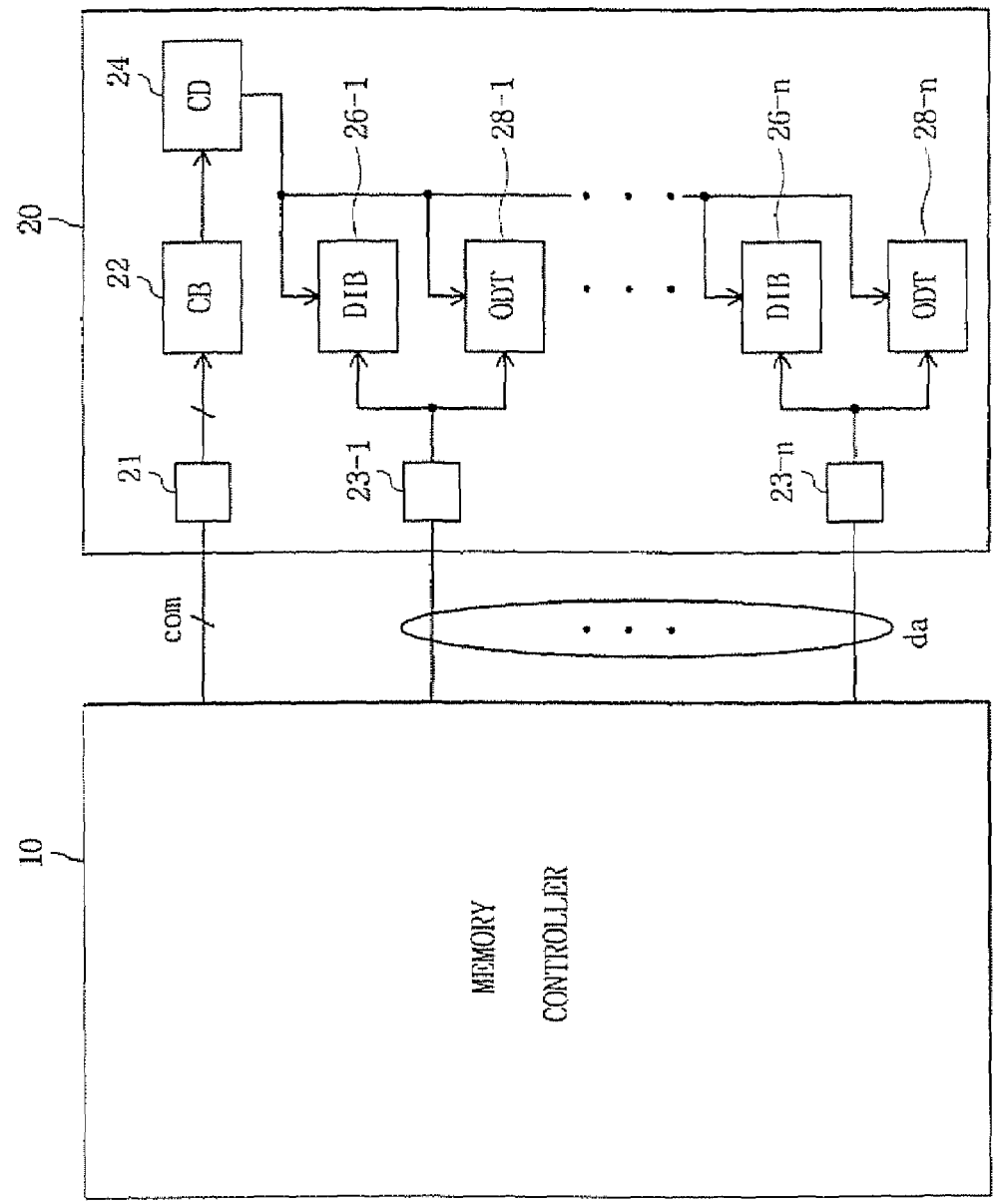
FIG. 1 is a block diagram schematically illustrating a conventional on die termination technique.
Figure 2:
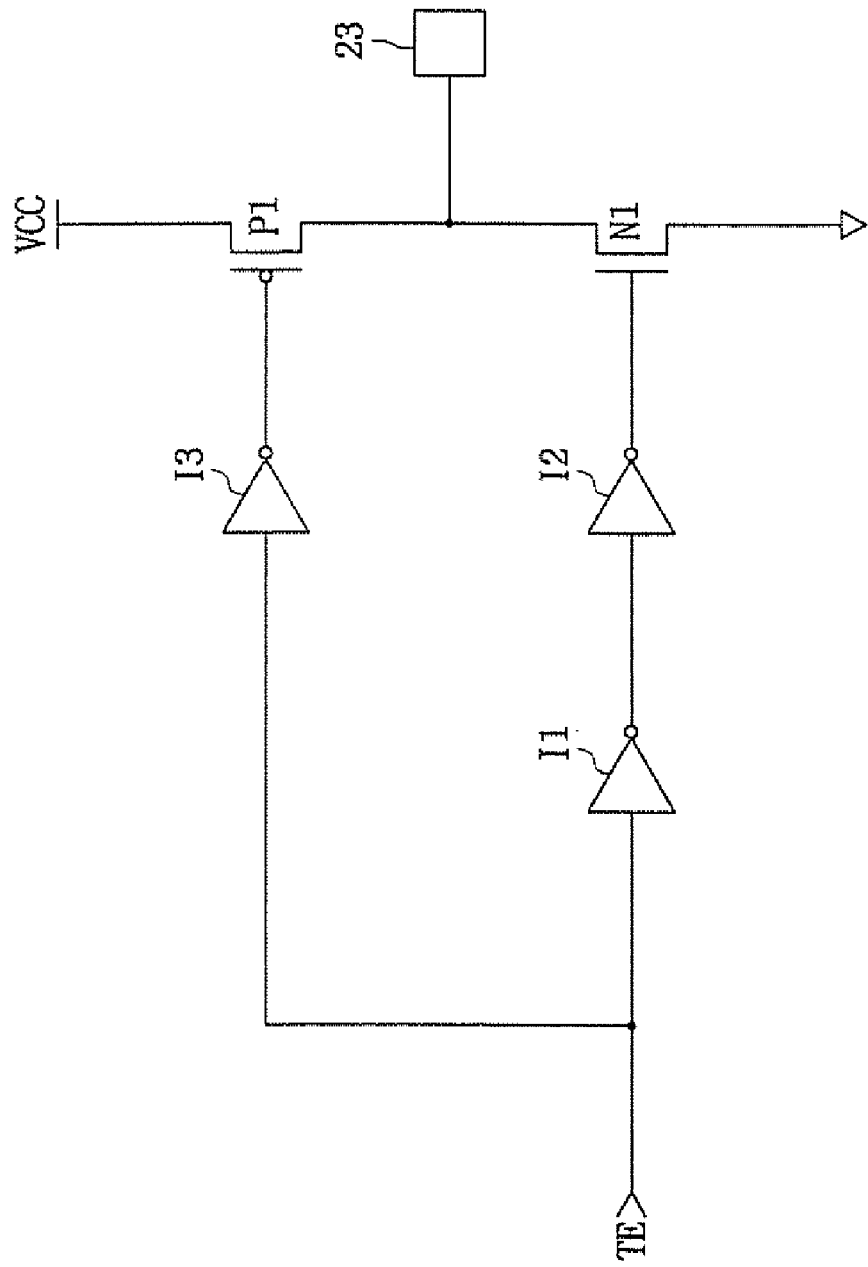
FIG. 2 is a circuit diagram illustrating a conventional on die termination circuit.
Figure 3:
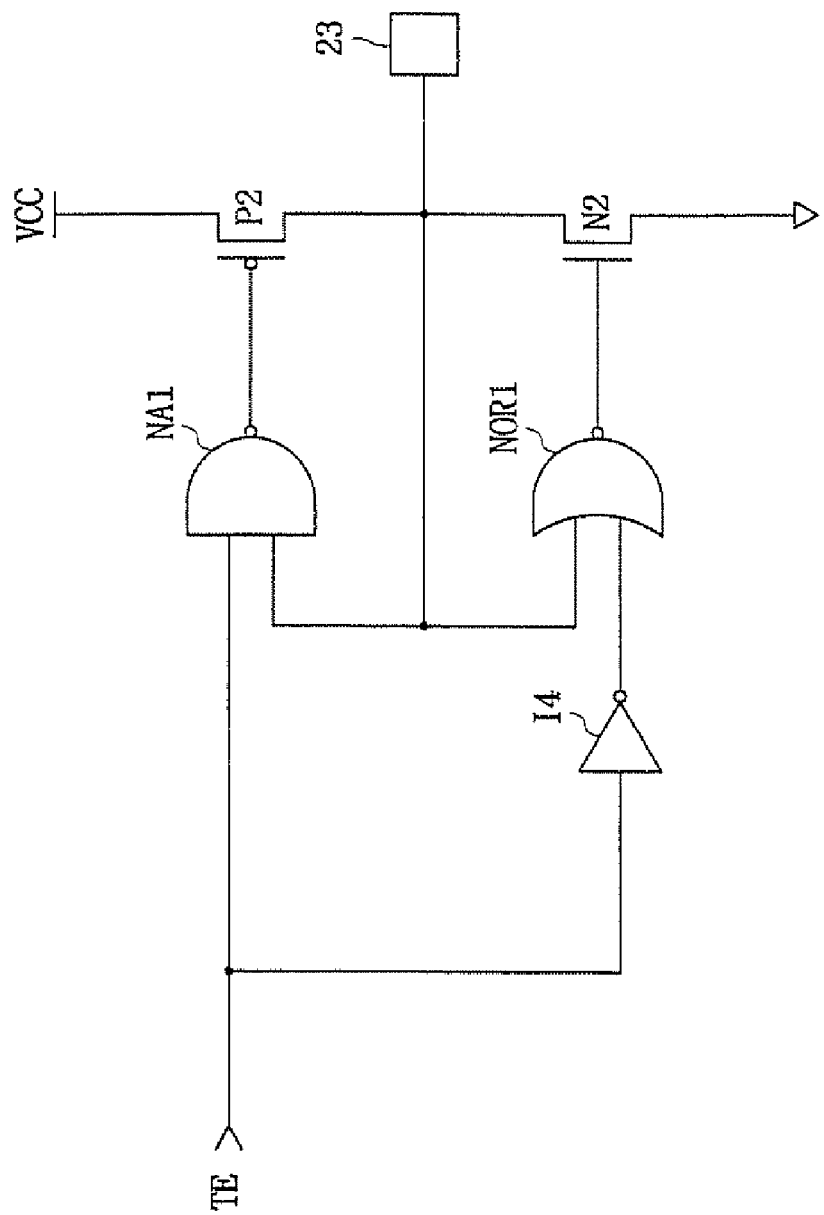
FIG. 3 is a circuit diagram illustrating another conventional on die termination circuit.
Figure 4:
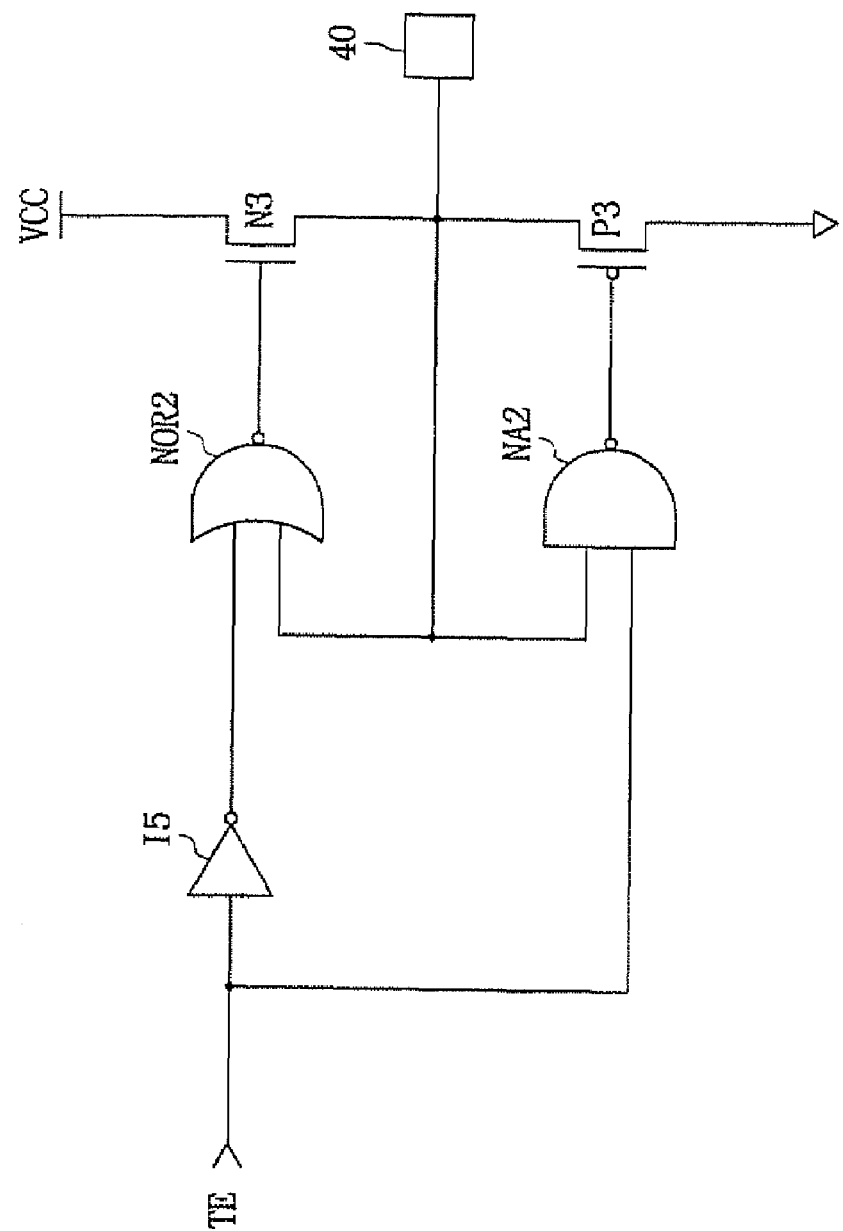
FIG. 4 is a circuit diagram illustrating an on die termination circuit according to some embodiments of the present invention.

FIG. 4 is a circuit diagram illustrating an on die termination circuit according to some embodiments of the present invention. In FIG. 4, the reference numeral 40 denotes a data input terminal or pad and TE denotes an on die termination control signal. The on die termination circuit of FIG. 4 includes an inverter I5, a NOR gate NOR2, a NAND gate NA2, an NMOS transistor N3 having controlled terminals (e.g., source and drain) coupled to a power voltage VCC and the pad 40 and a controlling terminal (e.g., gate) coupled to the output of the NOR gate NOR2. A PMOS transistor P3 has controlled terminals (e.g., source and drain) coupled to a ground voltage and the pad 40 and a controlling terminal (e.g. gate) coupled to the output of the NAND gate NA2. As used herein, the terms "power voltage" and "ground voltage" refer to a high level reference voltage and a low level reference voltage respectively. Accordingly, embodiments of the present invention should not be construed as limited to a particular form of or method of providing the power voltage and the ground voltage.

When the on die termination control signal TE is at a "low" level, the inverter I5 generates a signal of a "high" level and the NOR gate NOR2 generates a signal of a "low" level and the NMOS transistor N3 is turned off. The NAND gate NA2 generates a signal of a "high" level and the PMOS transistor P3 is turned off. Thus, on die termination is not performed.

When the on die termination control signal TE is at a "high" level and a signal of a "high" level is applied through the pad 40, the inverter I5 generates a signal of a "low" level, the NOR gate NOR2 generates a signal of a "low" level and the NMOS transistor N3 is turned off. The NAND gate NA2 generates a signal of a "low" level and the PMOS transistor P3 is turned on. Therefore, the "high" level signal applied through the pad 40 is terminated to a ground voltage level. In this case, current flow occurs from the pad 40 to a ground voltage. Therefore, the "high" level signal applied through the pad 40 does not result in a full swing, as the voltage level of the "high" level is reduced as a result of being terminated to ground through the PMOS transistor P3.

When the on die termination control signal TE is at a "high" level and a signal of a "low" level is applied through the pad 40, the inverter I5 generates a signal of a "low" level, the NOR gate NOR2 generates a signal of a "high" level and the NMOS transistor N3 is turned on. The NAND gate NA2 generates a signal of a "high" level and the PMOS transistor P3 is turned off. Therefore, a signal of a "low" level applied through the pad 40 is terminated to a power voltage level (VCC). In this case, current is supplied from a power voltage (VCC) to the pad 40 so that a signal of a "low" level applied through the pad 40 does not result in a full swing as the voltage level of the "low" level is increased by being terminated to VCC through the NMOS transistor N3.

Because the on die termination circuit of FIG. 4 does not result in a full swing between high and low levels applied to the pad 40, the circuit may be suitable for high speed operations. Furthermore, current consumption resulting from the PMOS transistor P3 and the NMOS transistor N3 being turned on at the same time does not occur.

Figure 5:
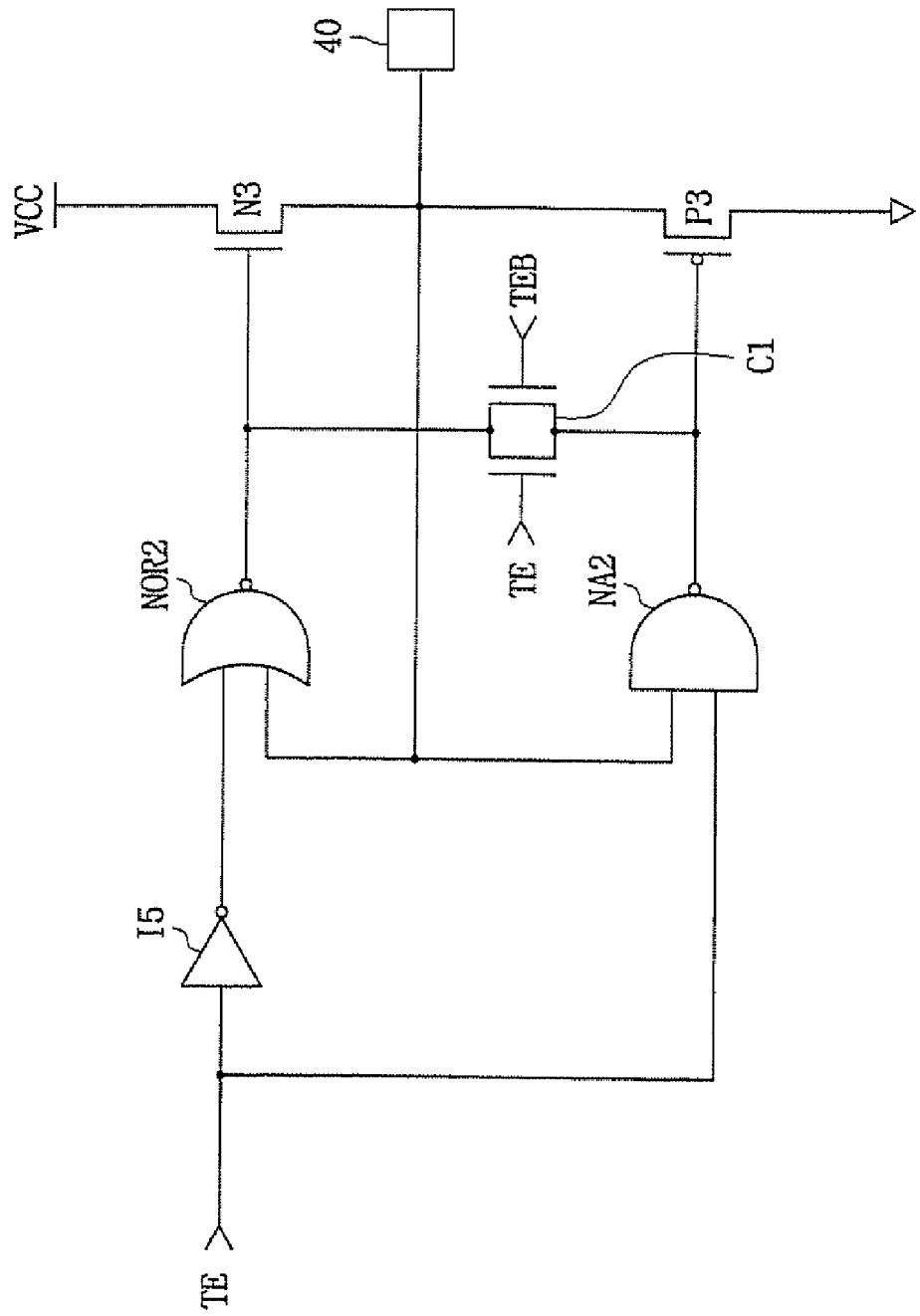
FIG. 5 is a circuit diagram illustrating an on die termination circuit according to further embodiments of the present invention.

FIG. 5 is a circuit diagram illustrating an on die termination circuit according to further embodiments of the present invention. The on die termination circuit of FIG. 5 further includes a CMOS transmission gate C1 in addition to the configuration of FIG. 4. In FIG. 5, TE denotes an on die termination control signal and TEB is an inverted form of the on die termination control signal TE. Operation of the circuit of FIG. 5 is the same as that of FIG. 4 except for the inclusion of the CMOS transmission gate C1 coupled between the controlling terminals of the transistors N3 and P3. Thus, operation of only CMOS transmission gate C1 is explained below.

When the on die termination control signal TE is at a "low" level, the CMOS transmission gate C1 is turned off. When the on die termination control signal TE is at a "high" level, the CMOS transmission gate C1 is turned on so that a difference in a level of the signals applied to the PMOS transistor P3 and the NMOS transistor N3 is reduced, minimized or eliminated.

When no signal is applied to the pad 40, the NOR gate NOR2 and the NAND gate NA2 should output signals of the same level. If the NOR gate NOR2 and the NAND gate NA2 do not output signals of the same level, for example, due to variations in processing, voltage and/or temperature, the CMOS transmission gate C1 is provided to reduce or eliminate a difference in the level of the signals. Therefore, when no signal is applied through the pad 40, only one of the PMOS transistor P3 or the NMOS transistor N3 is turned on. Thus, current flow through the transistors P3 and N3 does not occur because both the PMOS transistor P3 and the NMOS transistor N3 are not turned on.

Figure 6:
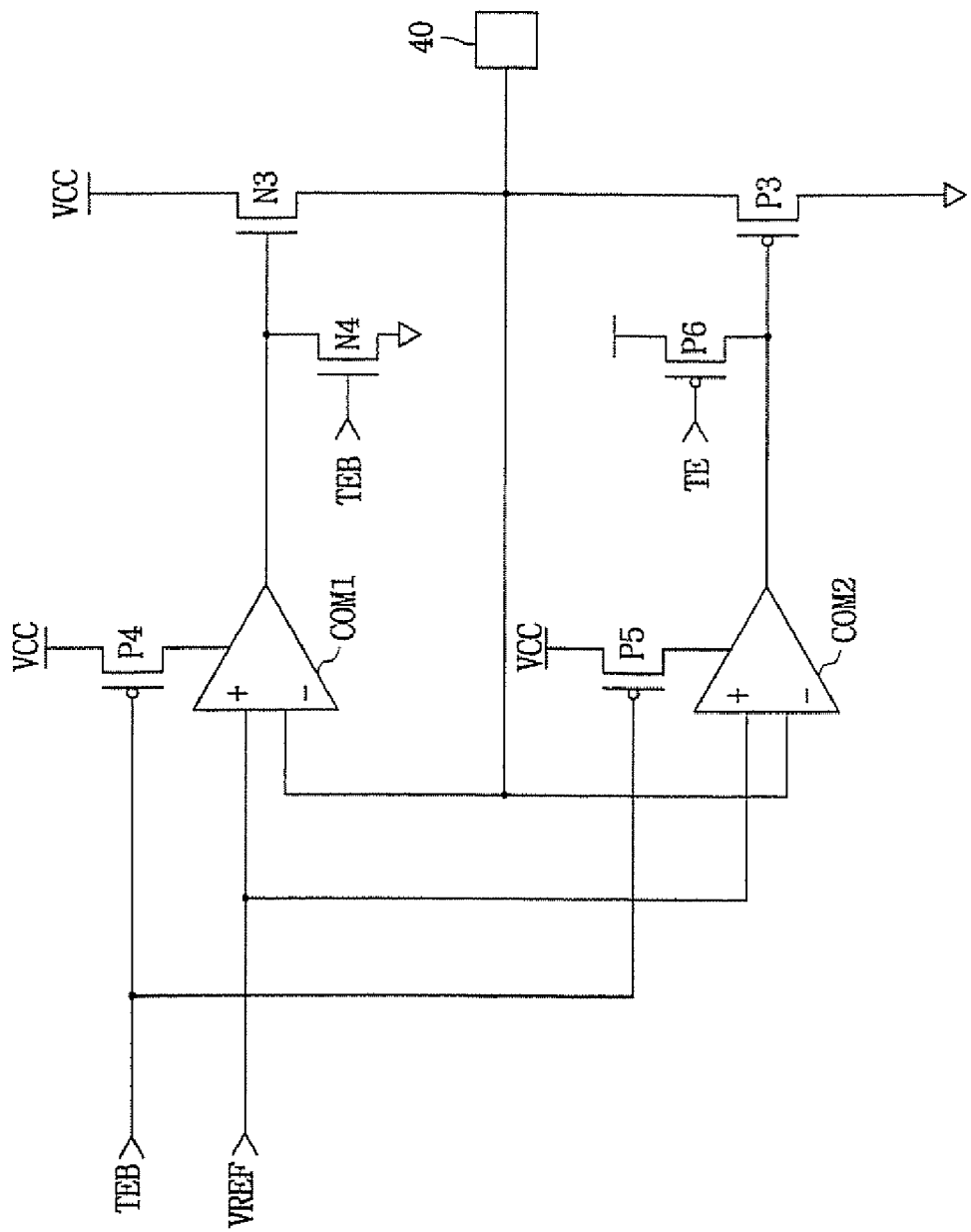
FIG. 6 is a circuit diagram illustrating an on die termination circuit according to additional embodiments of the present invention.

FIG. 6 is a circuit diagram illustrating an on die termination circuit according to further embodiments of the present invention. In FIG. 6, reference numeral 40 denotes a data input pad, TE denotes an on die termination control signal and TEB is an inverted form of the on die termination control signal TE. The on die termination circuit of FIG. 6 includes comparators COM1 and COM2, NMOS transistors N3 and N4, and PMOS transistors P3 to P6. The transistors N3 and P3 are coupled as described above except that their respective controlling terminals (gates) are coupled to the output of COM1 and COM2 respectively. The transistor N4 has controlled terminals (e.g., source and drain) coupled to the controlling terminal of transistor N3 and a ground voltage and a controlling terminal (e.g., gate) coupled to TEB. The transistor P6 has controlled terminals (e.g., source and drain) coupled to the controlling terminal of transistor P3 and a power voltage and a controlling terminal (e.g., gate) coupled to TE. Transistors P4 and P5 have controlled terminals coupled to a power voltage and to respective ones of the comparators COM1 and COM2 and controlling terminals coupled to TEB.

When an on die termination control signal TE is at a "low" level, the PMOS transistors P4 and P5 are turned off and the NMOS transistor N4 and the PMOS transistor P6 are turned on. The NMOS transistor N3 and the PMOS transistor P3 are turned off, so that the pad 40 is in a high impedance state. That is, on die termination is not performed.

When the on die termination control signal TE is at a "high" level the control signal TEB is at a "low" level so the PMOS transistors P4 and P5 are turned on and the NMOS transistor N4 and the PMOS transistor P6 are turned off. Therefore, operation of the comparators COM1 and COM2 is enabled.

In the enabled state, each of the comparators COM1 and COM2 compares a reference voltage VREF to the signal applied to the pad 40. If the signal applied to the pad 40 is a "high" level signal, the output of the comparators COM1 and COM2 is a "low" level signal. If the signal applied to the pad 40 is a "low" level signal, the output of the comparators COM1 and COM2 is a "high" level signal. That is, each of the comparators COM1 and COM2 generate a signal of a "low" level when the signal applied through the pad 40 is higher than the reference voltage VREF and a signal of a "high" level when the signal applied through the pad 40 is lower than the reference voltage VREF.

When each of the comparators COM1 and COM2 generate a signal of a "low" level, the NMOS transistor N3 is turned off, and the PMOS transistor P3 is turned on. In this case, current flow occurs from the pad 40 to a ground voltage. Therefore, the "high" level signal applied through the pad 40 does not result in a full swing, as the voltage level of the "high" level is reduced as a result of being terminated to ground through the PMOS transistor P3.

When each of the comparators COM1 and COM2 generate a signal of a "high" level, the NMOS transistor N3 is turned on, and the PMOS transistor P3 is turned off. In this case, current is supplied from a power voltage (VCC) to the pad 40 so that a signal of a "low" level applied through the pad 40 does not result in a full swing as the voltage level of the "low" level is increased by being terminated to VCC through the NMOS transistor N3. As a result, the on die termination circuit of FIG. 6 may operate to limit the swing of the signal applied to the pad 40 in a manner similar to that discussed above with reference to FIG. 4.

Figure 7:
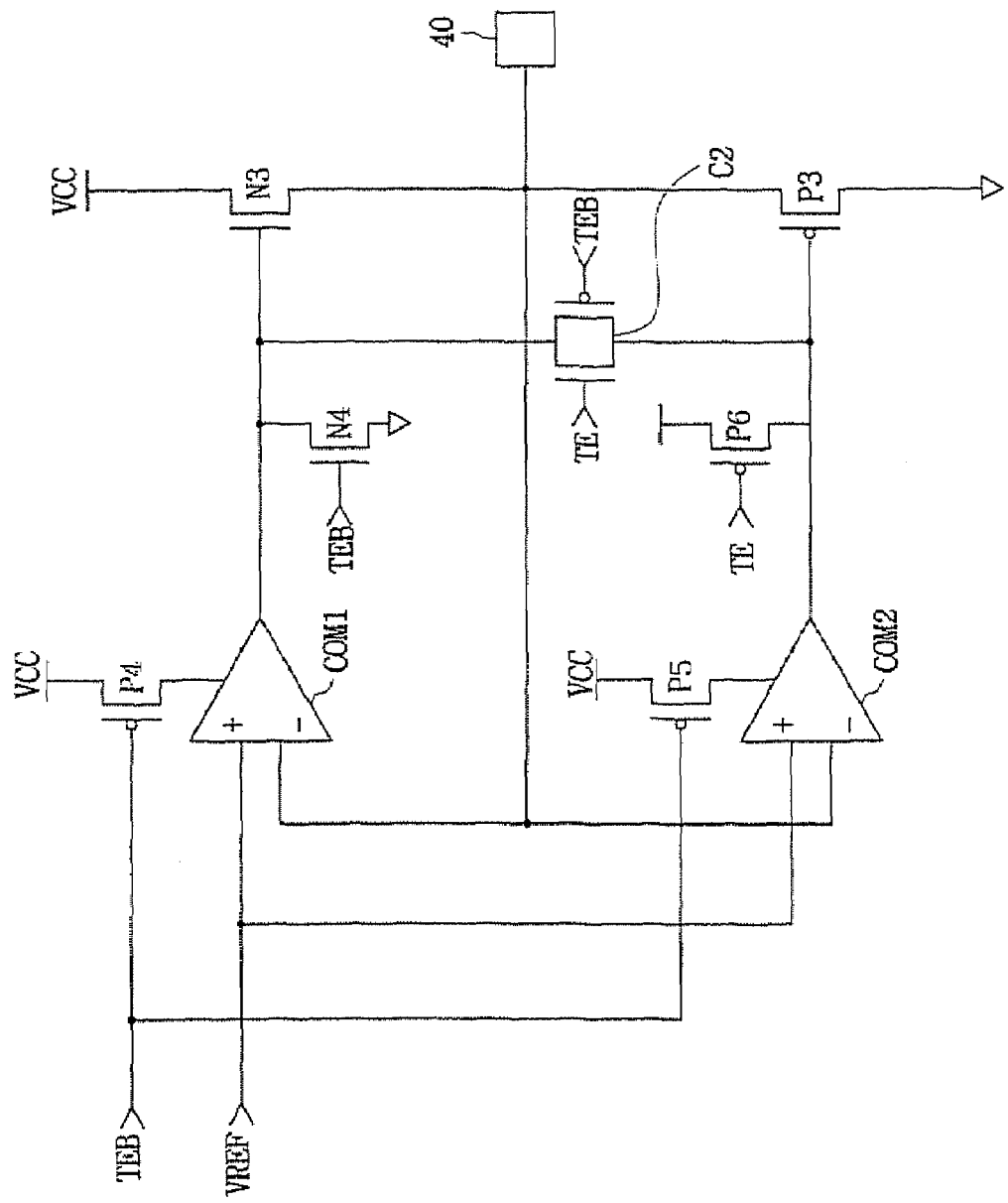
FIG. 7 is a circuit diagram illustrating an on die termination circuit according to still further embodiments of the present invention.

FIG. 7 is a circuit diagram illustrating an on die termination circuit according to additional embodiments of the present invention. The on die termination circuit of FIG. 7 further includes a CMOS transmission gate C2 coupled between the controlling terminals of the transistors N3 and P3 in addition to the circuit of FIG. 6. Operation of the circuit of FIG. 7 is the same as that of FIG. 6 except for with respect to the operation of the CMOS transmission gate C2, which is the same as the operation of the CMOS transmission gate C1 of FIG. 5.

When a signal is not applied through the pad 40, the comparators COM1 and COM2 should output signals of the same level. If the comparators COM1 and COM2 do not output signals of the same level, for example, due to variations in processing, voltage and/or temperature, the CMOS transmission gate C2 makes the level of the signals identical, thus preventing both the transistors N3 and P3 from turning on.

As described hereinbefore, on die termination circuit according to some embodiments of the present invention terminates to a ground voltage level when a signal of a "high" level is applied through the pad and terminates a power voltage level when a signal of a "low" level is applied through the pad. Thus a signal applied through the pad does not result in a full swing between the ground level and the power voltage level, which may be advantageous in providing for high speed operation. Also, on die termination circuits according to some embodiments of the present invention prevent turn on of both pull-up and pull-down transistors when on die termination is enabled and a signal is not applied through the pad.

While embodiments of the present invention have been described with reference to on die termination circuits, termination circuits according to embodiments of the present invention may also be utilized with devices where the termination circuit is not provided on the die. Accordingly, embodiments of the present invention should not be construed as limited to on die applications but may include any circuit configured to function as described herein.

Furthermore, while embodiments of the present invention have been described with reference to, for example, an active "high" control signal, embodiments of the present invention also include circuits with active low signals. Likewise, while particular logic gates have been illustrated in the figures, other logic gates may also be utilized that provide a corresponding function. Thus, for example, where a NAND gate is illustrated, an OR gate could be used if the inputs are inverted. Accordingly, embodiments of the present invention are intended to include all circuit configurations that provided the same functionality as that illustrated in the figures with regard to controlling the termination transistors.

While the present invention has been particularly shown and described with reference to particular embodiments thereof, it will be understood by those of ordinary skill in the art that various changes in form and details may be made therein without departing from the spirit and scope of the present invention as defined by the following claims.

What is claimed is:

1. An input termination circuit, comprising:
  a pull up circuit that is configured to terminate an input signal to a power voltage level responsive to the input signal being at a "low" level, the pull up circuit comprising:
    a first comparator circuit configured to be enabled responsive to a termination control signal and configured to compare a reference voltage and the input signal; and
    a pull up transistor having controlled terminals coupled to a power voltage and a terminal to which the input signal is applied and a controlling terminal coupled to an output of the first comparator circuit; and
  a pull down circuit that is configured to terminate the input signal to a ground voltage level responsive to the input signal being at a "high" level the pull down circuit comprising:
    a second comparator circuit configured to be enabled responsive to the termination control signal and configured to compare a reference voltage and the input signal; and
    a pull down transistor having controlled terminals coupled to a ground voltage and a terminal to which the input signal is applied and a controlling terminal coupled to an output of the second comparator circuit.

2. The input termination circuit of claim 1, wherein the pull up transistor is an NMOS transistor.

3. An input termination circuit, comprising:
  a pull down circuit that is configured to terminate an input signal to a ground voltage level responsive to the input signal being at a "high" level; and
  a pull up circuit that is configured to terminate the input signal to a power voltage level responsive to the input signal being at a "low" level, the pull up circuit comprising:
    a first comparator circuit configured to be enabled responsive to a termination control signal and configured to compare a reference voltage and the input signal;
    a pull up transistor having controlled terminals coupled to a power voltage and a terminal to which the input signal is applied and a controlling terminal coupled to an output of the first comparator circuit; and
    a first reset transistor coupled to the controlling terminal of the pull up transistor and responsive to the termination control signal to turn off the pull up transistor when the termination control signal is inactivated;
  wherein the first reset transistor includes an NMOS transistor having a first controlled terminal coupled to the controlling terminal of the pull up transistor, a second controlled terminal coupled to a ground voltage and a controlling terminal coupled to an inverted signal of the termination control signal.

4. An input termination circuit, comprising:
  a pull down circuit that is configured to terminate an input signal to a ground voltage level responsive to the input signal being at a "high" level, the pull down circuit comprising:
    a second comparator circuit configured to be enabled responsive to a termination control signal and configured to compare a reference voltage and the input signal;
    a pull down transistor having controlled terminals coupled to a ground voltage and a terminal to which the input signal is applied and a controlling terminal coupled to an output of the second comparator circuit; and
    a second reset transistor coupled to the controlling terminal of the pull down transistor and responsive to the termination control signal to turn off the pull down transistor when the termination control signal is inactivated; and
  a pull up circuit that is configured to terminate the input signal to a power voltage level responsive to the input signal being at a "low" level, the pull up circuit comprising:
    a first comparator circuit configured to be enabled responsive to the termination control signal and configured to compare the reference voltage and the input signal;
    a pull up transistor having controlled terminals coupled to a power voltage and a terminal to which the input signal is applied and a controlling terminal coupled to an output of the first comparator circuit; and
    a first reset transistor coupled to the controlling terminal of the pull up transistor and responsive to the termination control signal to turn off the pull up transistor when the termination control signal is inactivated.

5. The input termination circuit of claim 4, wherein the pull down transistor is a PMOS transistor.

6. The input termination circuit of claim 4, wherein the second reset transistor includes a PMOS transistor a first controlled terminal coupled to the controlling terminal of the pull down transistor, a second controlled terminal coupled to a power voltage and a controlling terminal coupled to the termination control signal.

7. The input termination circuit of claim 4, further comprising, a transmission gate responsive to the termination control signal and coupled between the controlling terminals of the pull up transistor and the pull down transistor.

8. The input termination circuit of claim 7, wherein the transmission gate is a CMOS transmission gate.

9. The input termination circuit of claim 1, wherein the pull up circuit is further configured to increase a level of the input signal being at the "low" level, and wherein the pull down circuit is further configured to decrease a level of the input signal being at the "high" level, the pull up and pull down circuits thereby lowering a swing of the input signal.

10. An input termination circuit, comprising:
a pull up transistor configured to pull up an input terminal to a power voltage level;
a pull down transistor configured to pull down the input terminal to a ground voltage; and
a control circuit responsive to a termination control signal and to a signal applied to the input terminal to turn on the pull down transistor and turn off the pull up transistor in response to the input signal transitioning to a "high" level and to turn off the pull down transistor and turn on the pull up transistor in response to the input signal transitioning to a "low" level, wherein the control circuit comprises:
a first comparator circuit configured to be enabled responsive to the termination control signal and configured to compare a reference voltage and the input signal and having an output coupled to a controlling terminal of the pull up transistor;
a first reset transistor coupled to the controlling terminal of the pull up transistor and responsive to the termination control signal to turn off the pull up transistor when the termination control signal is inactivated;
a second comparator circuit configured to be enabled responsive to the termination control signal and configured to compare the reference voltage and the input signal and having an output coupled to a controlling terminal of the pull down transistor; and
a second reset transistor coupled to the controlling terminal of the pull down transistor and responsive to the termination control signal to turn off the pull down transistor when the termination control signal is inactivated.

11. The input termination circuit of claim 10, wherein the first reset transistor includes an NMOS transistor having a first controlled terminal coupled to the controlling terminal of the pull up transistor, a second controlled terminal coupled to a ground voltage and a controlling terminal coupled to an inverted signal of the termination control signal; and
wherein the second reset transistor includes a PMOS transistor a first controlled terminal coupled to the controlling terminal of the pull down transistor, a second controlled terminal coupled to a power voltage and a controlling terminal coupled to the termination control signal.

12. The input termination circuit of claim 10, wherein the pull down transistor is a PMOS transistor and the pull up transistor is an NMOS transistor.

13. The input termination circuit of claim 10, further comprising, a transmission gate responsive to the termination control signal and coupled between the controlling terminals of the pull up transistor and the pull down transistor.

14. The input termination circuit of claim 13, wherein the transmission gate is a CMOS transmission gate.

15. The input termination circuit of claim 10, wherein the pull up transistor is further configured to increase a level of the input signal being at the "low" level, and wherein the pull down transistor is further configured to decrease a level of the input signal being at the "high" level, the pull up and pull down transistors thereby lowering a swing of the input signal.

16. The input termination circuit of claim 1, a first reset transistor coupled to the controlling terminal of the pull up transistor and responsive to the termination control signal to turn off the pull up transistor when the termination control signal is inactivated.

* * * * *

UNITED STATES PATENT AND TRADEMARK OFFICE
CERTIFICATE OF CORRECTION

| | | |
|---|---|---|
| PATENT NO. | : 7,368,937 B2 | |
| APPLICATION NO. | : 11/426139 | |
| DATED | : May 6, 2008 | |
| INVENTOR(S) | : Song | |

It is certified that error appears in the above-identified patent and that said Letters Patent is hereby corrected as shown below:

Column 9, Claim 1, Line 48: Please correct "circui t" to read -- circuit --

Signed and Sealed this

Twenty-second Day of July, 2008

JON W. DUDAS
*Director of the United States Patent and Trademark Office*